July 6, 1954  B. W. CAMPBELL  2,683,015
RESILIENT MOUNTING
Filed March 2, 1951

Inventor
Bruce W Campbell
By Ralph Hammar
Attorney

Patented July 6, 1954

2,683,015

UNITED STATES PATENT OFFICE 2,683,015

RESILIENT MOUNTING

Bruce W. Campbell, Erie, Pa., assignor to Lord Manufacturing Company, Erie, Pa., a corporation of Pennsylvania Application March 2, 1951, Serial No. 213,545

3 Claims. (Cl. 248—358)

This invention is intended to produce a spring mounting having controlled friction damping in horizontal and vertical directions. Features include a split damper and an arrangement in which one of the damper springs enters into the vertical spring rate of the mounting but is independent of the horizontal spring rate. Further objects and advantages appear in the specification and claims.

Figure 1:
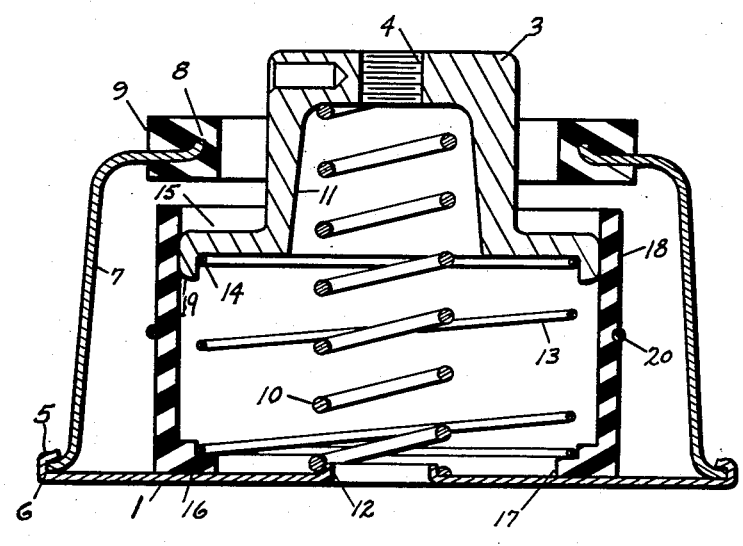
Figure 2:
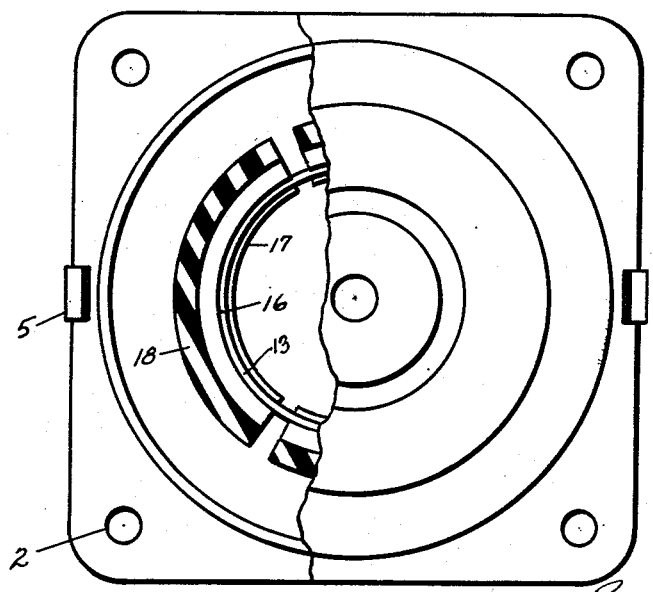

In the drawing, Fig. 1 is a sectional elevation and Fig. 2 is a top plan view of a mounting broken partly away.

In the mounting, the supporting and supported members comprise a base 1 having attaching holes 2 and a stud 3 threaded at 4 to receive a bolt. Ordinarily the base 1 will be attached to the support and the stud will be attached to the supported member, although the attachment can be reversed. The base has tabs 5, which are bent over the rim 6 of a cup-shaped housing member 7, having a flanged opening 8 normally spaced from the stud 3. A rubber grommet 9 secured in the opening 8 provides a rubber bumper for excessive amplitude or shock vibration. The flange 8 provides an extended surface which prevents cutting of the rubber grommet by sidewise loads, which cause the stud 3 to strike against the inner surface of the grommet.

The vertical load is carried by a coil spring 10 having its upper end seated within a counterbore 11 in the stud 3 and its lower end seated around an upturn cylindrical flange 12 which provides a spring seat on the base 1. The spring 10 is preferably wound so as to be non-linear with its spring rate increasing with deflection. This permits the use of the mounting on a wide range of loads. The vertical load is also taken to a minor extent by a compression spring 13 arranged between a seat 14 on the underside of a flange 15 at the lower end of the stud 3 and a seat 16 on inwardly extending flanges 17 of a segmental damper 18. The spring 13 is relatively weak compared to the spring 10 but it does enter into the vertical load sustaining capacity of the mounting.

The segmental damper is made in two or more segments which are compressed against the outer rim 19 of the flange 15 by a split snap ring 20. The frictional force on the rim of the flange 15 is independent of the position of the stud 3 so that the vertical damping is unaffected by the load. The horizontal damping is obtained by the frictional contact of the flanges 17 of the segmental damper members against the upper surface of the base 1. The horizontal damping force is determined by the spring 13 which can have an initial pre-loading such that the horizontal damping force will be essentially constant independent of the load. It would not be objectionable if the horizontal damping increased with the load.

Since the snap ring 20 holds the segmental damper 18 against the flange 15 at all times, the spring 13 does not resist sidewise movement of the stud 3 relative to the base. The sidewise stiffness of the mounting is determined by the spring 10.

The damping force from the segmental dampers 18 is controllable as to the vertical damping by the stiffness of the snap ring 20 and as to horizontal damping by the stiffness and preloading or pre-compression of the spring 13. The snap ring 20 which controls the vertical damping has no effect upon the load carrying capacity of the mounting. The spring 13 which determines the horizontal damping has a small effect upon the vertical load carrying capacity of the mounting. It is accordingly possible to control the damping characteristics of the mounting with a minimum interference of the vibration isolating characteristics.

The split damper arrangement also remains essentially constant despite wear on the frictionally contacting parts. The snap ring 20 can maintain essentially constant friction damping under all loads and is substantially unaffected by wear on the contacting surfaces. Likewise the pre-compression of the spring 13 can be such that contact between the flanges 17 and the upper surface of the base 1 is substantially unaffected by wear and has a negligible or at least a tolerable increase with the increase in the weight of the supported member carried by the stud 3.

In the normal use of the mounting, the base 1 will be attached to a support through the attaching holes 2 and the supported member will be attached to the stud 3 by a screw threaded into the hole 4. In the normal position, the parts will occupy the position shown in Fig. 2 and vibration will be cushioned by the spring 10 and to a minor extent by the spring 13. Vibrations in a vertical direction will be frictionally damped by rubbing of the flange 15 against the inner surface of the segmental damping members 18. Damping in a horizontal direction will be frictionally resisted by rubbing of the flanges 17 against the upper surface of the base. Under abnormal conditions due to shock the mounting stud 3 may strike against the rubber grommet 9. In a sidewise direction the stud will engage the inner surface of the grommet and the flange 8 will provide an extended surface which will minimize cutting of the grommet. In the vertical direction, the flange 15 will strike against the underside of the grommet or some part of the supported member attached to the stud 3 will strike against the upper side of the grommet. The grommet does not enter into the vibration isolating characteristics but merely prevents metal to metal contact under shock conditions.

What I claim as new is:

1. In a resilient mounting, supporting and supported members, spring means therebetween resiliently carrying the vertical load of the supported member, one of said members having a vertical cylindrical surface spaced from the spring means and the other of the members having a horizontal surface, a segmental cylindrical damper concentric with the vertical cylindrical surface and resting against the horizontal surface, and spring means urging the segments of the damper against said surfaces.

2. In a resilient mounting, supporting and supported members, spring means therebetween resiliently carrying the vertical load of the supported member, one of said members having a vertical cylindrical surface and the other of the members having a horizontal surface, a segmental damper having ends engaging said horizontal surface and having cylindrical sides engaging said cylindrical surface, a spring urging the sides of the damper segments against said cylindrical surface, and another spring urging the ends of the damper segments against said horizontal surface.

3. In a resilient mounting, supporting and supported members, one comprising a flanged stud and the other comprising a base, opposed spring seats on the stud and base, a load supporting spring between the seats, a segmental cylindrical damper having ends resting on the base and cylindrical surfaces engaging the flange, a contractile spring urging the segments against the flange, and another spring urging the ends of the segments against the base.

References Cited in the file of this patent

UNITED STATES PATENTS

| Number | Name | Date |
| --- | --- | --- |
| 2,519,702 | Robinson | Aug. 22, 1950 |
| 2,520,442 | Schwartz | Aug. 29, 1950 |